(12) United States Patent
Lagali et al.

(10) Patent No.: US 6,222,955 B1
(45) Date of Patent: Apr. 24, 2001

(54) INTEGRATED 1×N OPTICAL SWITCH

(75) Inventors: Neil S. Lagali, Brantford; Ian MacDonald, Manotick; Reza Paiam, Ottawa, all of (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/227,856

(22) Filed: Jan. 11, 1999

Related U.S. Application Data

(60) Provisional application No. 60/073,314, filed on Jan. 30, 1998, and provisional application No. 60/073,398, filed on Jan. 30, 1998.

(51) Int. Cl.[7] .................................................. G02B 6/26
(52) U.S. Cl. .................................. 385/20; 385/46; 385/24
(58) Field of Search ................................. 385/20, 21, 24, 385/46

(56) References Cited

U.S. PATENT DOCUMENTS 4,881,788 * 11/1989 Doran ................................ 350/96.15

FOREIGN PATENT DOCUMENTS

WO 96/24080   8/1999  (WO) ............................ G02B/6/28

OTHER PUBLICATIONS

General self–imaging properties in N×N multimode interference couplers including phase relations; M. Bachmann; P.A. Besse; H. Melchior Applied Optics, vol. 33, No. 18 Jun. 20, 1994. pp. 3905–3911.

Overlapping–image multimode interference couplers with a reduced number of self–images for uniform and nonuniform power splitting M. Bachmann; P.A.Besse; H.Melchior Applied Optics, vol. 34, No. 30, Oct. 20, 1995.pp. 6898–6910.

Compact Polarization–insensitive multi–leg 1×4 mach–zehnder switch in InGaAsP/Inp M. Bachmann; Ch. Nadler; P.A.Besse; H. Melchior Proc. ECIO, Firenze, Italy, 1994. pp. 519–522.

(List continued on next page.)

*Primary Examiner*—Hung N. Ngo
(74) *Attorney, Agent, or Firm*—Neil Teitelbaum

(57) ABSTRACT

An optical apparatus is disclosed that includes a first Z×T optical switch having Z input ports and T output ports, where T is at least 2, optically coupled to an integrated optical generalized Mach-Zehnder interferometer. The result is an optical switch, which is operated using a smaller number of control elements and control levels than the generalized Mach-Zehnder interferometer alone.

20 Claims, 5 Drawing Sheets

OTHER PUBLICATIONS

Optical Multi–Mode Interference Devices Based on Self–Imaging: Principles and Applications L.B.Soldan; Erik C.M Pennings J. Lightwave Technology, vol. 13, No. 4, Apr. 1995.pp. 615–627.

Novel 1×N and N×N Integrated optical switches using self–imaging multimode GaAs/AlGaAs waveguides R.M. Jenkins; J.M.Heaton; D.R.Wight; J.T.Parker; J.C.H.Birbeck; G.W. Smith; K.P. Hilton Appl. Phys. Lett. vol. 64, No. 6. Feb. 7, 1994 pp. 684–686.

The integrated prism interpretation of multileg Mach–Zehnder interferometers based on multimode interference couplers Ins. Quantum Electronics, vol. 27. 1995.pp. 900–920.

New 2×2 and 1×3 Multimode Interfernce Couplers with Free Selection of Power Splitting Ratios Journal of Lightwave Technology. vol. 14, No. 10, Oct. 1996.pp. 2286–2293.

Arbitrary ratio power splitters using angled silica on silicon multimode interference couplers Electronics Letters, vol. 32, No. 17, Aug. 15, 1996. pp. 1576–1577.

"Novel 1xN and NxN integrated optical switches using self–imaging Multimode gaas/algaas waveguides" Jenkins et al. Applied Physics Letters, American Institute of Physics, New York, vol. 64, Nr.6, pages 684–686.

"Optical Multi–mode interference devices based on self–imaging: Principles and applications" Soldano et al. Journal of Lightwave Technology, IEEE, New York, vol. 13, Nr.5 pages 615–627.

"Phase Relations in Multi–mode interference couplers and their application to generalized integrated mach–Zehnder optical switches" Besse et al. European Conference on integrated optics with technical exhibition Apr. 1993, pp. 1–4.

European Search Report EP 99 10 1456.

* cited by examiner

INTEGRATED 1×N OPTICAL SWITCH

This application claim benefit to provisional application 60/073,314 filed Jan. 30, 1998 which claims benefit to provisional application 60/073,398 filed Jan. 30, 1998.

FIELD OF THE INVENTION

This invention relates generally to optical communication systems and the like. One particular aspect of this invention relates to a 1×N optical switch.

BACKGROUND OF THE INVENTION

As we move towards the realization of optical routing in fiber networks, it is becoming increasingly important to provide signal-processing functions such as switching, in optical form at the network nodes. Optical switching is expected to become more and more important as wavelength division multiplexing reaches further into networks, greatly expanding the number of optical paths available. By using integrated optical components to perform the network node routing functions, advantages in terms of functionality, size, speed, and efficiency are achieved.

The integrated optical multimode interference (MMI) coupler has been the subject of much attention and research in recent years see, for example: L. B. Soldano, et al. in a paper entitled "Planar Monomode Optical Couplers Based on Multimode Interference Effects," *J. Lightwave Technol.*, vol. 10, no. 12, pp. 1843–1849, 1992; M. Bachmann, et al. in a paper entitled "General self-imaging properties in N×N multimode interference couplers including phase relations," *Appl. Opt.*, vol. 33, no. 18, pp. 3905–3911, 1994; and L. B. Soldano et al., in a paper entitled "Optical multi-mode interference devices based on self-imaging: principles and applications," *J. Lightwave Technol.*, vol. 13, no. 4, pp. 615–627, April 1995. All references in this document are herein incorporated by reference. It has been shown that MMI couplers can be used in generalized Mach-Zehnder interferometer configurations, to actively route and switch optical signals as detailed by: L. B. Soldano et al., in a paper entitled "Optical multi-mode interference devices based on self-imaging: principles and applications," *J. Lightwave Technol.*, vol. 13, no. 4, pp. 615–627, April 1995; and R. M. Jenkins, et al., in a paper entitled "Novel 1×N and N×N integrated optical switches using self-imaging multimode GaAs/AlGaAs waveguides," *Appl. Phys. Lett.*, vol. 64, no. 6, pp. 684–686, February 1994.

Generally, the 1×N switch is controlled by applying N sets of phase shifts to N arms. For small N, the phase shifts are quantized into a small number of discrete levels, and control is possible using digital logic circuitry to drive the phase shifters. As N increases, however, the driving conditions of the switch become more complex. The number of discrete phase shift levels, the number of independent phase shifts, and the maximum phase shift required all increase. As a result, the operation of larger switches requires elaborate control circuitry and higher power levels.

It would be advantageous to provide an apparatus that improves the control of the 1×N switch.

OBJECT OF INVENTION

Thus, in an attempt to overcome limitations of known prior art devices, it is an object of this invention to provide a new 1×N optical switch.

SUMMARY OF THE INVENTION

In accordance with the invention there is provided an optical switch for routing a beam of light from a first input port to a selected output port, the optical switch comprising: a Z×T optical switch having Z input ports including the first input port and T output ports; an integrated optical Mach-Zehnder interferometer comprising a first N×N multimode interference coupler having N input ports and N output waveguides, at least two of the N input ports coupled to at least two of the T output ports of the Z×T optical switch, and a second N×N multimode interference coupler having N output ports including the selected output port and N input waveguides, wherein N output waveguides of the first N×N multimode interference coupler are optically coupled with N input waveguides of the second N×N multimode interference coupler thereby forming N waveguide arms; and an optical path length changer for changing an optical path length of at least one of the N waveguide arms, wherein N is an even value greater than 3, and T is at least 2, such that the beam of light is launched into the first input port and emerges substantially from the selected output port.

In accordance with the invention there is further provided an optical switch for routing a beam of light from an input port to a selected output port, the optical switch comprising: a first Z×T optical switch having Z input ports, including the first input port, and T output ports; an integrated optical P×U GMZI comprising a splitting region having P input ports at least two of the P input ports coupled to at least two of the T output ports, a combining region having U output ports, including the selected output port, and N waveguide arms coupling the splitting region to the combining region, the N waveguide arms disposed along an open path and grouped as pairs of arms, two substantially central waveguide arms forming a first pair, and each subsequent pair formed by two waveguide arms, one on each side of the already grouped waveguide arms; and a controller for providing a control signal and an actuator for receiving the control signal and for substantially simultaneously changing optical path lengths of two individual waveguide arms that form a pair by substantially a same amount in response to the control signal, wherein N is an even value greater than 3, U is at least 3, T and P are at least 2, and P is less than or equal to N.

In preferred embodiments of the invention: Z=1; Z=1 and T=2; P=U=N; and P=2. In another preferred embodiment of the invention N=U and P=2.

In accordance with the invention there is further provided a method of upgrading an integrated N×N optical Mach-Zehnder interferometer, N being an even value greater than 3, to form an optical switch for routing a beam of light from an input port to a selected output port which comprises a step of optically coupling two input ports of the integrated N×N optical Mach-Zehnder interferometer to two output ports of a 1×2 optical switch.

In many instances monitoring of an optical beam is required. A small fraction in the form of a tap function of optical power distributed to a specified port is used as a monitor to ensure a specified intensity or integrity, i.e., switch state.

BRIEF DESCRIPTION OF THE DRAWINGS

Exemplary embodiments of the invention will now be described in conjunction with the following drawings, in which.

In the following detailed description of the invention the same numbering is used in different figures to designate similar components.

DETAILED DESCRIPTION OF THE PREFERRED EMBODIMENTS OF THE INVENTION

Theoretical Basis

Passive N×N GMZI

Figure 1:
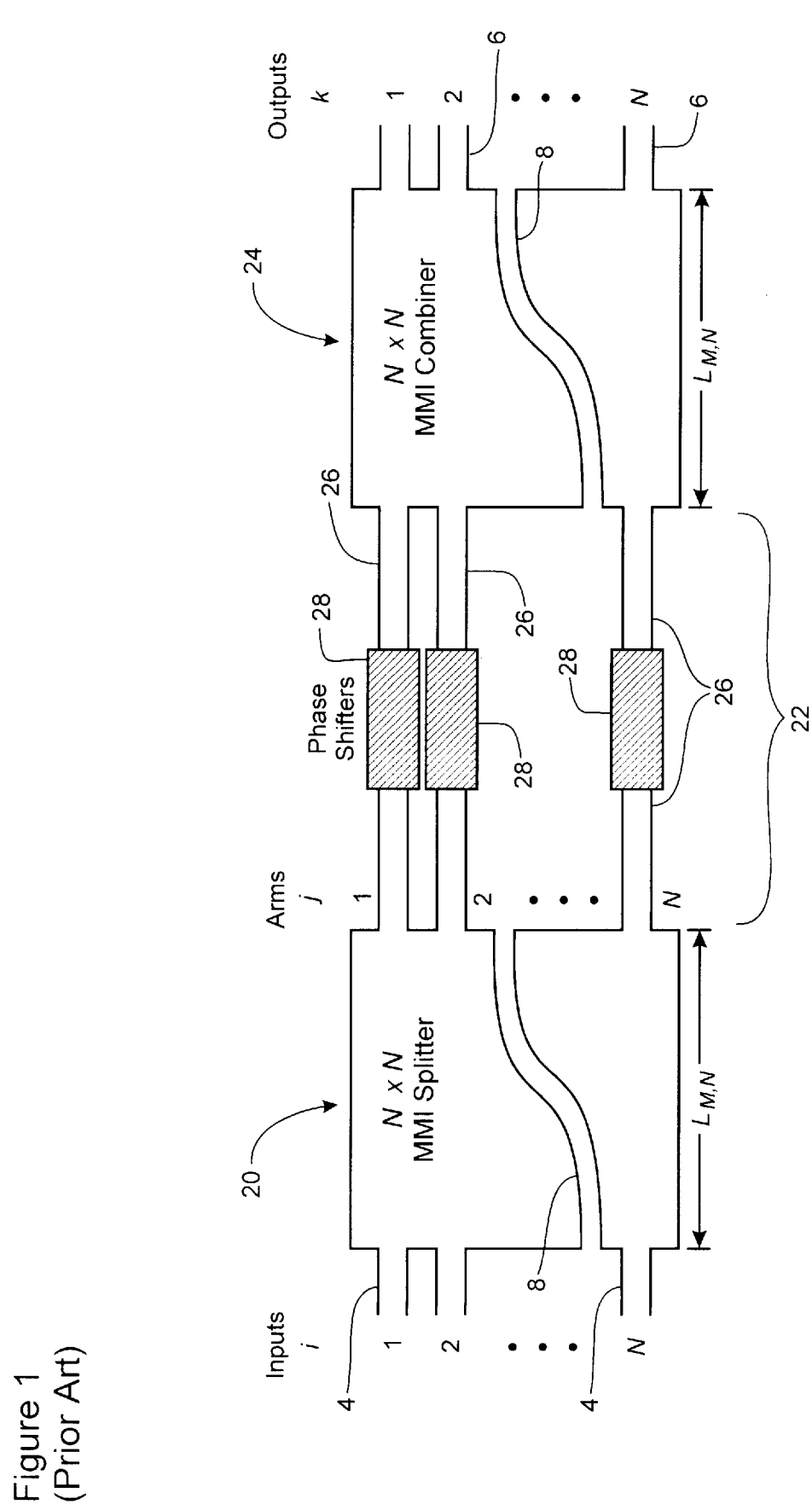
FIG. 1 is a schematic illustration of a general layout of an N×N generalized Mach-Zehnder interferometer. Identical N×N MMI couplers are used as splitter and combiner. The same corresponding numbering direction has been used for both input and output ports.

Referring to FIG. 1, the basic layout of the N×N GMZI consists of three components: an N×N MMI splitter 20; an active phase shifting region 22 having N optical path length changers in the form of phase shifters 28 in the active phase shifting region; and an N×N MMI combiner 24. The MMI splitter 20 is illustrated as a substantially rectangular body; one side of the rectangular body having input ports 4 and the opposing side of the rectangular body having output waveguides. The MMI combiner 24 is illustrated as a substantially rectangular body, one side of the rectangular body having output ports 6 and the opposing side having input waveguides. In the N×N GMZI, the output waveguides of the N×N MMI splitter 20 and the input waveguides of the N×N MMI combiner 24 are optically coupled and form waveguide arms 26 between the N×N MMI splitter 20 and the N×N MMI combiner 24. Optionally, waveguide arms are integrated absent any coupling therebetween. The waveguide arms 26 are shown as having substantially equal lengths. The N waveguide arms 26 are shown numbered sequentially from top to bottom, 1 to N. The first to N-th waveguide arms 26 are in the form of an open path, i.e., in a substantially linear open path starting at a first end, first waveguide arm 26, and ending at a second opposing end, N-th waveguide arm 26. No distinction is made between the ends of the input and output ports of the MMI splitter 20 and combiner 24 and the wavelength arms 26 connected thereto since, in practice, these waveguides are fabricated as integral, continuous waveguides. Two different types of N×N GMZI are also possible, one in which N is odd and one in which N is even, as explained below.

Phase shifters 28 are shown intimate with the waveguide arms 26. An individual phase shifter 28 is shown associated with a single waveguide arm 26. When the phase shifters 28 when not active or are not present, the device is passive. An active phase shifter 28 changes an optical path length of its associated waveguide arm 26. The bodies of the MMI splitter 20 and the N×N MMI combiner 24 are illustrated as having a break line 8. The break line 8 is used to indicate that the number N of corresponding input ports 4 and output ports 6 varies according to design requirements.

Phase shifting is well known. For example, changing the optical path length of the light medium can perturb the phase of a beam of light passing through the medium. Changing the refractive index of a medium or the length of the medium in which the beam of light is guided changes the optical path length of the medium. Many phase shifting effects may be exploited in design of GMZIs, for example, temperature, electro-optic effects, opto-optic effects, stress within a medium, and magnetic effects; information pertaining to phase shifting effects is presented in Nishihara, et al. in "Optical Integrated Circuits". New York: McGraw-Hill, 1989, ch. 5. Commonly, a chromium heater electrode deposited on top of a waveguide arm 26 is used to heat the waveguide arm 26 thereby providing a thermally induced phase shift caused by a change in the optical path length. An optical field at any of the input ports 4 of the MMI splitter 20 is reproduced at all output ports of the splitter, resulting in an equal distribution of light power to all waveguide arms 26 of the active phase shifting region 22. These distributions of the light have equal intensity, but different phase. The terms "power" and "intensity" as used herein are interchangeable as one skilled in the art will appreciate power is time dependent intensity.

A passive N×N GMZI is shown in FIG. 1. The N×N MMI splitter 20 initially distributes input light equally among the waveguide arms 26, providing N distributions, while imposing a relative phase difference amongst the input light as discussed by M. Bachmann, et al., in "General self-imaging properties in N×N multimode interference couplers including phase relations," Appl. Opt., vol. 33, no. 18, pp. 3905–3911, June 1994. The N×N MMI combiner 24, substantially identical to the N×N MMI splitter 20, recombines the N distributions. By actively controlling the optical path lengths of the N waveguide arms 26, with phase shifters 28, the relative phases among the N distributions are changed. The interference between the N distributions in the N×N MMI combiner 24 is thus controlled, with the result that light launched into an input port 4 may be routed to any of the N output ports 6.

The M-th N-fold imaging length of each MMI coupler in FIG. 1 is given by M. Bachmann, et al., ibid:

$$L_{M,N} = \frac{M}{N} 3L_\pi, \tag{1}$$

where $L_\pi$ is the beat length of the coupler, and M and N are any two positive integers without a common divisor. The shortest coupler length is obtained when M=1. The beat length $L_\pi$ is defined as found in by M. Bachmann, et al., ibid:

$$L_\pi = \frac{\pi}{\beta_0 - \beta_1}, \tag{2}$$

where $\beta_0$ and $\beta_1$ are the propagation constants of the fundamental and first order modes, respectively, supported by each MMI that is a multimode region.

Since all the waveguide arms 26 are of equal length, no relative phase shift is imparted to the light in the arms of the passive device. The only effect of the waveguide arms 26 is to introduce a temporal delay from the output ports of the splitter to the input ports of the combiner. Therefore, disregarding the presence of the waveguide arms 26, results in a merging of the N×N MMI splitter 20 and the N×N MMI combiner 24 into a single MMI coupler having double the length:

$$L_{GMZI} = \frac{M}{N}3L_\pi + \frac{M}{N}3L_\pi = \frac{M}{N}6L_\pi. \tag{3}$$

Rearranging equation (3), we obtain two alternate expressions for the GMZI length:

$$L_{GMZI} = \frac{2}{N}3L_\pi \quad \text{for } N \text{ odd}, \tag{4}$$

and $$L_{GMZI} = \frac{1}{(N/2)}3L_\pi = \frac{3L_\pi}{K} \quad \text{for } N \text{ even}, \tag{5}$$

where M=1 has been used, and $$N=2K, K=1,2,3,\ldots. \tag{6}$$

Therefore there are two cases to consider: a first case where N is odd and a second case where N is even. Comparing equation (1) and equation (4), it is evident that for N odd, the passive GMZI acts like a single MMI splitter with M=2 and N output distributions. By contrast, upon comparison of equation (1) and equation (5) for N even, it is seen that the passive GMZI acts like a single MMI splitter with a reduced number (K) of output distributions.

In both cases, we have N output ports. For N odd, the action of the passive GMZI is trivial: the N output distributions emerge from the N output ports. For N even, there are N output ports, and only K distributions. When light is launched into an input port it is not obvious from which output ports the light will emerge. This depends upon both the input port into which light is launched and the value of K. For N even, it is helpful to consider two cases: K even and K odd.

K even

The passive GMZI acts like an MMI coupler with K output ports and K is even. The geometry of an MMI coupler with an even number of output ports has been described by Bachmann et. al., ibid for an N×N MMI coupler. The N×N MMI coupler 20, 24 functions as the N×N MMI splitter 20 or the N×N MMI combiner 24.

For an N×N coupler the spacing of the N input distributions and output distributions are described by intervals of length 2W/N, where W is the coupler width. For an N×K coupler, however, the spacing of the K output distributions are described by intervals of length:

$$\frac{2W}{K} = \frac{4W}{N}, \tag{7}$$

In the N×N coupler, the positions of the input distributions and output distributions are specified by a free parameter α, which is limited to the range 0<α<W/N, or half an interval length. In the N×K coupler, the same restriction holds for the input distributions, however, the output distributions are positioned as described by equation (7). A free parameter α' is used to describe the positions of the output distributions, where 0<α'<W/K.

For light launched into an input port i=1, α'=α, so K self-distributions emerge from the set of output ports:

$$k_1=1,4,5,8,9,12,13,\ldots \tag{8}$$

For light launched into an input port i=2, however, α'=2W/N−α, so K self-distributions emerge from the set of output ports:

$$k_2=2,3,6,7,10,11,14,\ldots \tag{9}$$

which represents the complement of the set of ports given by $k_1$.

Figure 2:
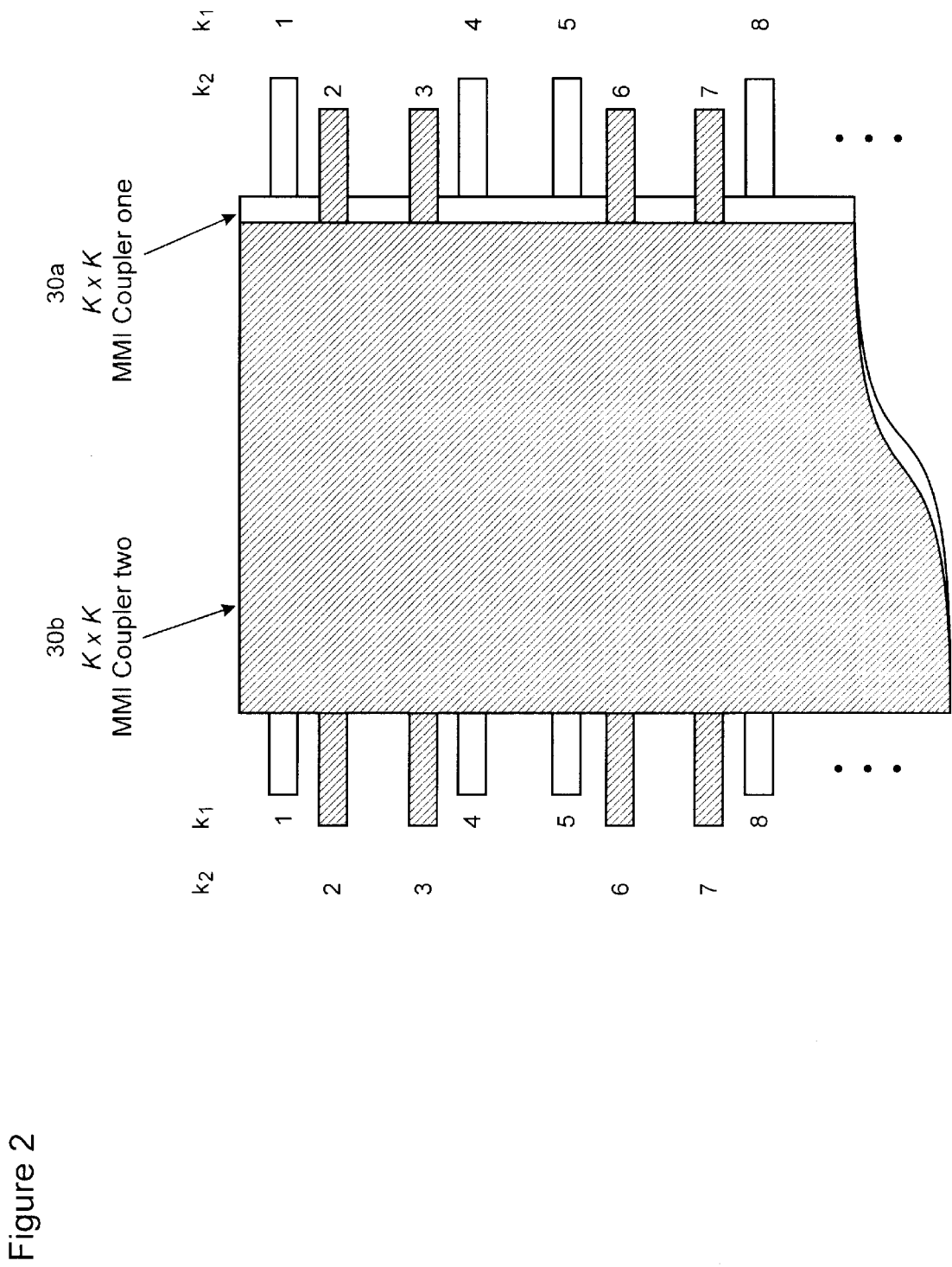
FIG. 2 is a schematic illustration of a passive N×N GMZI for N=2K, with K even. The GMZI consists of two superimposed K×K MMI couplers, distinguished by shading, that possess input and output ports from the same port set.

Referring to FIG. 2, for the N×K coupler where K is even, light launched into input ports in the set $k_1$ form K output distributions in the set $k_1$, and light launched into input ports in the set $k_2$ form K output distributions in the set $k_2$. This is written more compactly as:

$$i \in \{k_1\} \rightarrow k=k_1$$
$$i \in \{k_2\} \rightarrow k=k_2 \tag{10}$$

For K even, the passive GMZI consists of two superimposed K×K MMI couplers, a first K×K MMI coupler 30a and a second K×K MMI coupler 30b, each coupler 30a and 30b with input ports and output ports from the same set.

K odd

Figure 3:
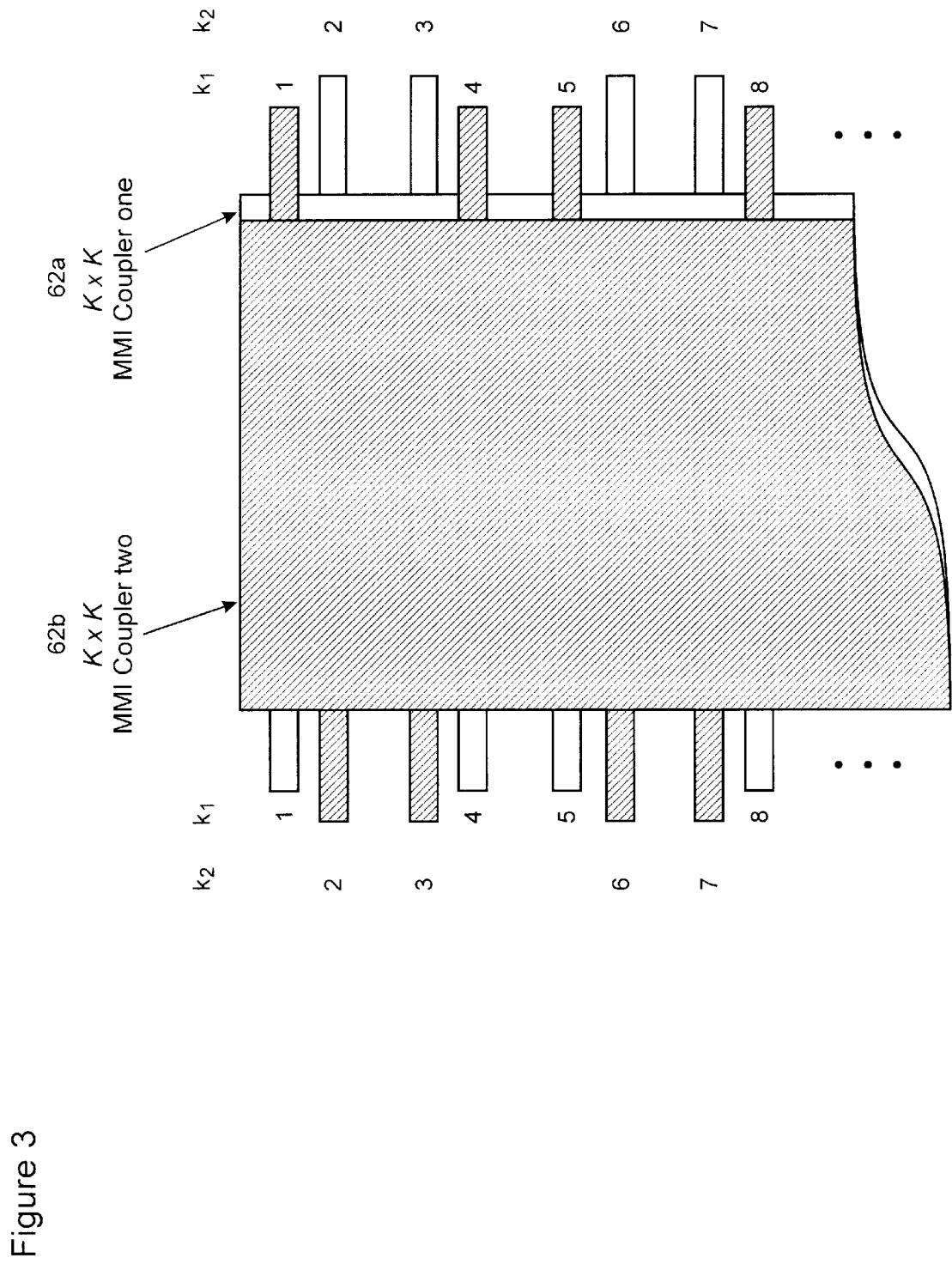
FIG. 3 is a schematic illustration of a representation of the passive N×N GMZI for N=2K, with K odd. The GMZI consists of two superimposed K×K MMI couplers, that possess input and output ports from different port sets.

Referring to FIG. 3, a diagram wherein K is odd is shown. The spacing of the N output distributions are described by intervals of length 2W/N, except for the first interval of length W/N. For the N×K coupler, the spacing of the K distributions are described by intervals of length given by equation (7), except for the first interval, which has a length:

$$\frac{W}{K} = \frac{2W}{N}. \tag{11}$$

In a similar manner to the case of K even, the positions of the input distributions and output distributions are again described by the free parameters α and α'. In this case, however, the presence of an interval of length given by equation (11) results in light launched into input ports in the set $k_1$ forming K output distributions in the set $k_2$, and light launched into input ports in the set $k_2$ forming K output distributions in the set $k_1$. This is written more compactly as:

$$i \in \{k_1\} \rightarrow k=k_2$$
$$i \in \{k_2\} \rightarrow k=k_1 \tag{12}$$

For K odd, the passive GMZI consists of two superimposed K×K MMI couplers, a first K×K MMI coupler 62a and a second K×K MMI coupler 62b, each coupler 62a and 62b with input ports and output ports in different sets. This is shown in FIG. 3.

The above description of a passive GMZI, is useful in understanding an improved active GMZI according to the invention.

Active GMZI

By operating N phase shifters 28 on the waveguide arms 26 of the N×N GMZI, the device functions as a 1×N switch when the applied phase shifts are multiples of π/N. N sets of phase shifts, corresponding to the columns of an optimum phase shift matrix X, are required to route light launched into a given input port to any of the N output ports. This is shown, for example, by R. M. Jenkins, et al., in "Novel 1×N and N×N integrated optical switches using self-imaging multimode GaAs/AlGaAs waveguides," *Appl. Phys. Lett.*, vol. 64, no. 6, pp. 684–686, February 1994, and P. A. Besse, et al., in "The integrated prism interpretation of multileg Mach-Zehnder interferometers based on multimode interference couplers," *Opt. Quant. Electron.*, vol. 27, pp. 909–920, 1995.

As N increases, the number of discrete phase shift levels within the matrix X also increases, however, a simplification of the phase shifts is possible. When N is even, the columns of X are divided into two sets of K columns each. For ease of description, one set of columns is designated "minimal" and the other is designated "non-minimal".

By inspection of the matrix X for N up to 20, the minimal sets are found to possess the following properties:

1. The phase shifts are symmetric about a horizontal line bisecting the N phase shifters which results in a reduced number, K, of independent phase shifts;
2. The K sets of phase shifts are anti-symmetric in pairs, about a horizontal line bisecting the K sets of K phase shifts which reduces the number of sets of controlling phase shifts;
3. The phase shifts have a range, which is the smallest of any of the N columns in X which minimizes the active driving requirements; and,
4. The phase shifts have the smallest number of discrete levels of any of the N columns in X which simplifies the control logic.

It is reasonable to predict that the above properties are applicable for all even values of N.

By contrast, the non-minimal sets do not have the properties stated above: they are in general neither symmetric nor anti-symmetric, nor do they necessarily have the smallest maximum phase shift or the smallest number of discrete levels of any of the columns in X.

Each column of X gives the phase shifts required to route light launched into the input port i to the output port k corresponding to the column number, so the sets of minimal and non-minimal columns correspond to sets of minimal and non-minimal output ports. These are interpreted as the output ports, to which light is switched using minimal phase shifts, and using non-minimal phase shifts, respectively. Comparing the minimal and non-minimal port numbers to the analysis of the passive GMZI, it is found that the minimal set always corresponds to the set to which the input light is distributed in the passive GMZI. Depending on the value of K, referring to either FIG. 2 or FIG. 3, the following general rule is determined: routing light launched into any of the input ports of a given K×K coupler to any of the output ports of the same K×K coupler is accomplished using minimal phase shifts, while routing light launched into any of the input ports of a given K×K coupler to any of the output ports of a different K×K coupler requires non-minimal phase shifts. This allows improved design of 1×N GMZI switches.

Simultaneous routing is also possible, because the K×K couplers are identical. In other words, the same phase shifts which cross-connect ports in a given K×K coupler simultaneously cross-connect ports in the other K×K coupler. The set of K cross-connections possible in both K×K couplers is therefore achieved using only the K sets of minimal phase shifts.

Improved 1×N Switch
  Theory and Design
    From the above properties, and FIGS. 2 and 3, it is evident that the minimal and non-minimal output ports correspond to either set $k_1$ or set $k_2$. This result shows that, for light launched into a single input port and N even, the N×N active GMZI is operated as a 1×K switch, using only minimal phase shifts. If it is possible to remove the restriction of a single input port and allow the capability of switching light between input ports from different sets, then it is possible to access the alternate K outputs as well, resulting in a 1×N switch that is operated using only K sets of minimal phase shifts.

Figure 4:
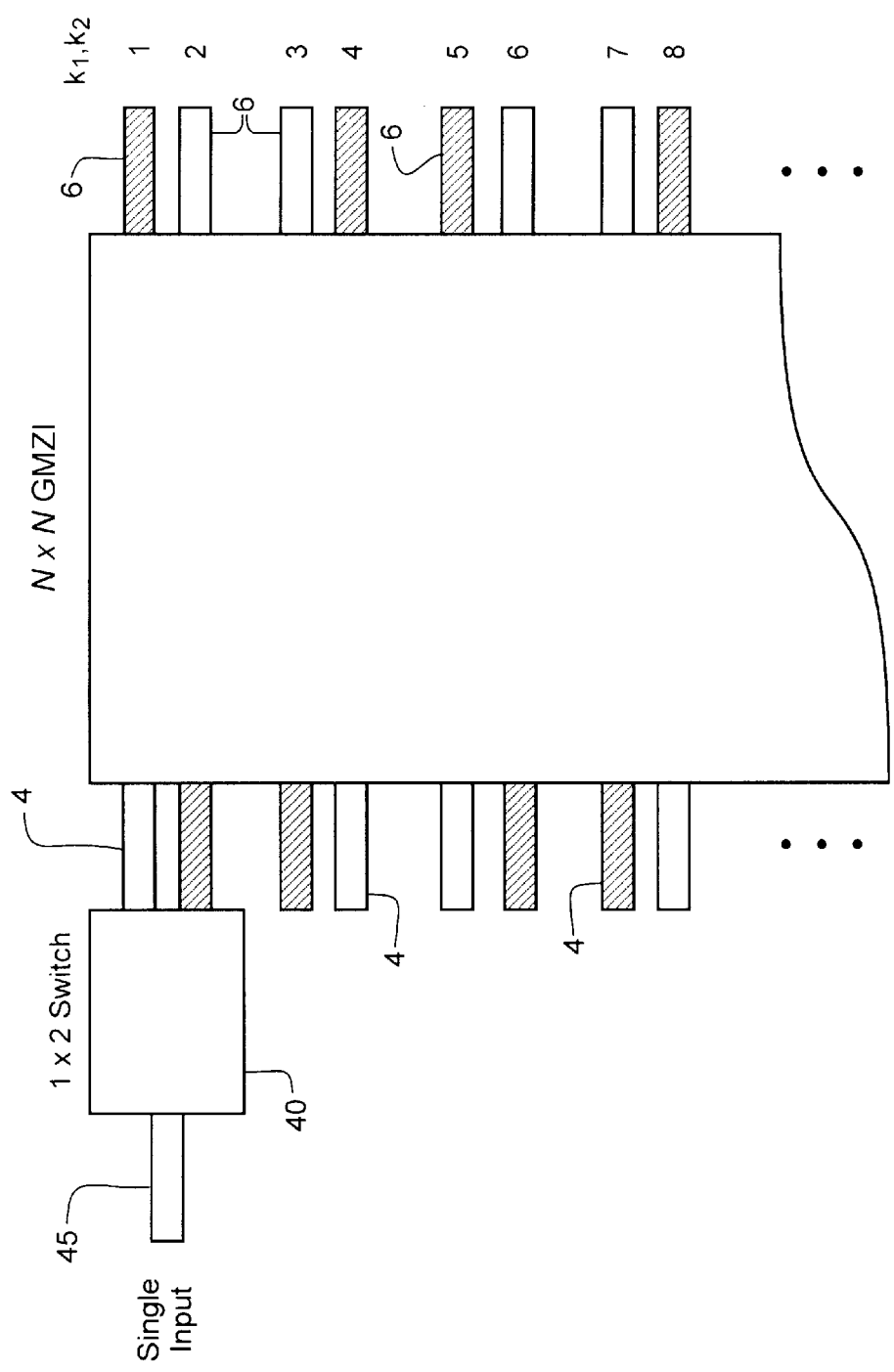
FIG. 4 is a schematic illustration of an improved 1×N switch design. The case where K is odd is shown. Ports with similar shading belong to the same K×K coupler. By switching a single input between GMZI inputs which correspond to different K×K couplers, a single input is routed to any output port using an efficient set of phase shifts.
Figure 5:
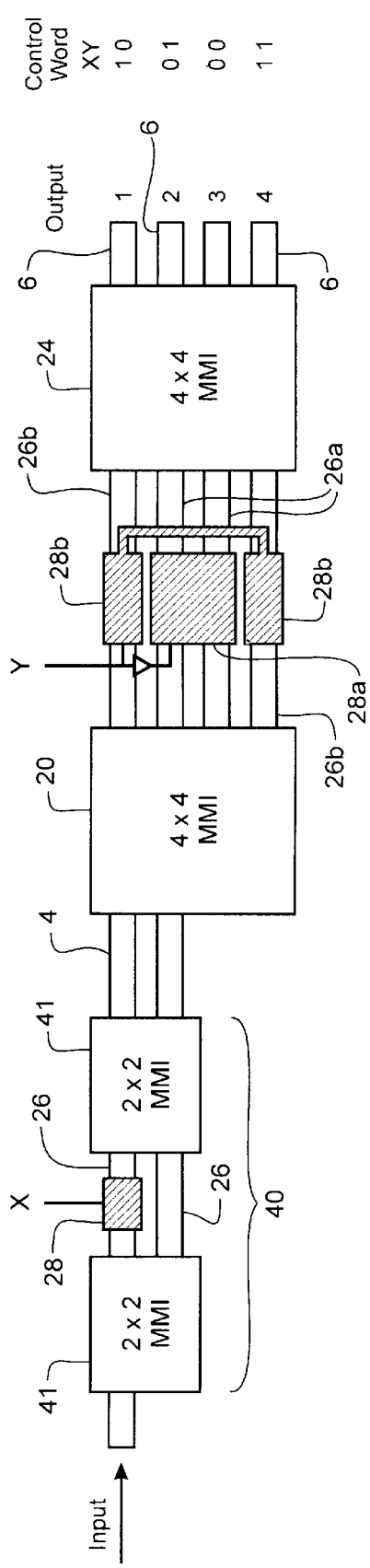
FIG. 5 is a schematic illustration of operation of the improved 1×4 switch. The two symmetry conditions on the phase shifts result in the control of the 4×4 GMZI by a single binary bit Y. An additional bit X is required to control the 1×2 switch. Routing to any output is possible by applying a two-bit binary control word XY to the device.

Referring to FIG. 4 and FIG. 5, the restriction of launching a beam of light into a single input port of a GMZI is removed by utilizing a 1×2 switch 40. The 1×2 switch 40 has a single input port 45 and output ports of the 1×2 switch 40 are optically coupled to any two GMZI input ports 4 from different sets The different sets correspond to the set numbering given by equation (8) and equation (9). The 1×2 switch 40 allows switching of a single beam of light launched into the input port of the 1×2 switch 40 into any of two GMZI input ports 4 from the different sets. The 1×2 switch 40 is not restricted to a single input port 45. The 1×2 switch 40 in some cases is formed from two 2×2 MMIs 41 optically coupled by two waveguide arms 26, at least one of the two waveguide arms 26 having a phase shifter 28. Any desired output of light is then achieved with minimal phase shifts, by operating the 1×2 switch 40 such that the input port of the GMZI corresponds to the same K×K coupler as the output port.

The improved 1×N switch has a number of advantages over the standard 1×N GMZI switch. The minimal sets of phase shifts are symmetric, as stated in property 1, above. This means that it is possible to physically connect the phase shifters or their controllers in pairs, so that only K+1 rather than N independent phase shifters are needed to operate the device; an additional phase shifter is needed to operate the 1×2 switch at the GMZI input ports, if a 1×2 GMZI is chosen as the switch. From property 2, the improved switch is controlled using a number of phase shifts given by $$\frac{K}{2} = \frac{N}{4} \text{ for } K \text{ even} \tag{13}$$

or $$\frac{K+1}{2} = \frac{N}{4} + \frac{1}{2} \text{ for } K \text{ odd} \tag{14}$$

instead of N distinct sets of phase shifts. Furthermore, from properties 3 and 4, the range of phase shifts are minimized, and the number of different phase shift levels is much smaller than needed to operate an isolated N×N GMZI switch.

The number of phase shifters 28 and their positions are generalized for N waveguide arms 26. The waveguide arms 26 are disposed along an open path and grouped as pairs of waveguide arms, two substantially central waveguide arms 26 forming a first pair 26a of waveguide arms, and each subsequent pair of waveguide arms 26b, and so on formed by two waveguide arms, one on each side of the already grouped waveguide arms 26a, 26b, . . . and wherein two individual waveguide arms that form a pair have their individual optical path lengths changed in unison such that both optical path lengths of the pair are changed by substantially the same amount. FIG. 5 shows two grouped sets of waveguide arms 26, namely 26a and 26b. The phase shifter 28a, which controls optical path length of the first pair of waveguide arms 26a, and the phase shifter 28b, which controls optical path length of a first subsequent pair of waveguide arms 26b, are both shown as single phase shifters, however this does not preclude the possibility of using individual phase shifters, while controlling each pair by a single power source and/or controller.

The improved 1×N switch according to the invention is exemplified below by way of an example.

Improved 1×4 Switch

The smallest improved 1×N switch occurs for N=4. Using well known phase relations for MM1 couplers, an optimum switching phase shift matrix is determined for launching a beam of light into an arbitrarily chosen input port i=1:

$$X = \frac{\pi}{2}\begin{bmatrix} 0 & -1 & -1 & 1 \\ 1 & -1 & 1 & 0 \\ 1 & 1 & -1 & 0 \\ 0 & 1 & 1 & 1 \end{bmatrix}. \quad (15)$$

A method of determining the matrix is explained by M. R. Paiam and R. I. MacDonald, in "Design of phased-array wavelength division multiplexers using multimode interference couplers," *Appl. Opt.*, Vol. 36, no. 21, pp. 5097–5108, July 1997.

In this case K is even. Using equation (10) and the properties above, we see that since i belongs to the set $k_1$, then the minimal phase shifts correspond to the output ports $k_1$, or columns 1 and 4. These phase shift sets satisfy the four properties stated above: They are symmetric about a horizontal line bisecting the matrix X, resulting in 2 sets of independent phase shifts, given in bold; The 2 sets of 2 phase shifts are anti-symmetric with respect to each other, about a line bisecting the 2 phase shifts; The phase shifts have a range $[0, \pi/2]$ which is the smallest of any of the N columns in X; and, The phase shifts have two discrete levels, which is the smallest number possible from the N columns in X.

The minimal phase shifts route light launched into the input port i=1 to output port number 1 and output port number 4. From equation (10), however, it is evident that the remaining output ports number 2 and number 3 are accessed by routing the input light to a member of the set $k_2$. For simplicity, the input i=2 is chosen.

Using phase relations of MM1 couplers as provided by M. R. Paiam and R. I. MacDonald, in "Design of phased-array wavelength division multiplexers using multimode interference couplers," *Appl. Opt.*, Vol. 36, no. 21, pp. 5097–5108, July 1997, it is possible to show that the same set of phase shifts corresponding to column 1 in equation (15), or the connection pair (i, k)=(1,1) also yields the connection pair (2,3). Similarly, column 4 in equation (15) corresponds to the connection pairs (1,4) and (2,2).

All four states of a 1×4 switch are therefore accessible if a 1×2 switch is used to switch between the input ports i=1 and i=2. The operation of this improved 1×4 switch is shown in FIG. 5. As a consequence of the two symmetry properties, the 4×4 GMZI is controlled using only a single set of two phase shifts. When this set is represented by a binary value, 0 or 1, then control of the 4×4 GMZI portion of the switch is possible using a single binary bit. An additional binary bit is used to control the 1×2 switch, so that it is possible to control the improved 1×4 switch shown in FIG. 5 with a 2-bit binary word.

Numerous other embodiments may be envisaged without departing from the spirit and scope of the invention.

What is claimed is:

1. An optical switch for routing a beam of light from a first input port to a selected output port, the optical switch comprising:

a Z×T optical switch having Z input ports including the first input port and T output ports;

an integrated optical Mach-Zehnder interferometer comprising a first N×N multimode interference coupler having N input ports and N output waveguides, at least two of the N input ports coupled to at least two of the T output ports of the Z×T optical switch, and a second N×N multimode interference coupler having N output ports including the selected output port and N input waveguides, wherein N output waveguides of the first N×N multimode interference coupler are optically coupled with N input waveguides of the second N×N multimode interference coupler thereby forming N waveguide arms; and an optical path length changer for changing an optical path length of at least one of the N waveguide arms, wherein N is an even value greater than 3, and T is at least 2, such that the beam of light is launched into the first input port and emerges substantially from the selected output port.

2. An optical switch for routing a beam of light from an input port to a selected output port according to claim 1, wherein at least one of the T output ports is coupled to an input port of the N input ports selected from input ports of the group $K_1$ and another of the T output ports is coupled to an input port of the N input ports selected from the group $K_2$.

3. An optical switch for routing a beam of light from an input port to a selected output port according to claim 2, wherein the group $K_1$ consists of input ports from the N input ports that, when numbered sequentially along an open path from 1 to N, have port numbers that when divided by 4 have a remainder from the group of 1 and 4 and, wherein the group $K_2$ consists of input ports from the N input ports that, when numbered sequentially along an open path from 1 to N, have port numbers that when divided by 4 have a remainder from the group of 2 and 3.

4. An optical switch for routing a beam of light from an input port to a selected output port according to claim 3, wherein the optical path length changer comprises an optical path length changer for changing an optical path length of each of the N waveguide arms.

5. An optical switch for routing a beam of light from an input port to a selected output port according to claim 4, wherein the N waveguide arms are disposed along an open path and grouped as pairs of waveguide arms, two substantially central waveguide arms forming a first pair of waveguide arms, and each subsequent pair of waveguide arms formed by two waveguide arms, one on each side of the already grouped waveguide arms, and wherein the optical path length changer is for changing path lengths of two individual waveguide arms that form a pair substantially simultaneously such that both optical path lengths of the pair are changed by substantially a same amount.

6. An optical switch for routing a beam of light from an input port to a selected output port according to claim 5, wherein the optical path length changer comprises a thermal source for heating a waveguide arm.

7. An optical switch for routing a beam of light from an input port to a selected output port according to claim 6, wherein substantially a same amount of electrical power is applied to the thermal source to heat both waveguide arms within a pair of waveguide arms.

8. An optical switch for routing a beam of light from an input port to a selected output port according to claim 5, wherein the optical path length changer comprises a controller for providing a control signal and an actuator for receiving the control signal and for changing optical path lengths of pairs of waveguide arms from the pairs of waveguide arms in response to the control signal.

9. An optical switch for routing a beam of light from an input port to a selected output port according to claim 4, wherein Z=1.

10. An optical switch for routing a beam of light from an input port to a selected output port according to claim 4, wherein Z=1 and T=2.

11. An optical switch for routing a beam of light from an input port to a selected output port according to claim 4, wherein the first Z×T optical switch comprises an integrated 1×2 optical switch.

12. An optical switch for routing a beam of light from an input port to a selected output port according to claim 11, wherein the integrated 1×2 optical switch comprises a 1×2 Mach-Zehender Interferometer.

13. An optical switch for routing a beam of light from an input port to a selected output port, the optical switch comprising:

a first Z×T optical switch having Z input ports, including the first input port, and T output ports;

an integrated optical P×U GMZI comprising a splitting region having P input ports at least two of the P input ports coupled to at least two of the T output ports, a combining region having U out put ports, including the selected output port, and N waveguide arms coupling the splitting region to the combining region, the N waveguide arms disposed along an open path and grouped as pairs of arms, two substantially central waveguide arms forming a first pair, and each subsequent pair formed by two waveguide arms, one on each side of the already grouped waveguide arms; and a controller for providing a control signal and an actuator for receiving the control signal and for substantially simultaneously changing optical path lengths of two individual waveguide arms that form a pair by substantially a same amount in response to the control signal, wherein N is an even value greater than 3, U is at least 3, T and P are at least 2, and P is less than or equal to N.

14. An optical switch for routing a beam of light from an input port to a selected output port according to claim 13, wherein optical path length is changed by a thermal source for heating the pair of waveguide arms.

15. An optical switch for routing a beam of light from an input port to a selected output port according to claim 13, wherein Z=1.

16. An optical switch for routing a beam of light from an input port to a selected output port according to claim 13, wherein Z=1 and T=2.

17. An optical switch for routing a beam of light from an input port to a selected output port according to claim 13, wherein P=U=N.

18. An optical switch for routing a beam of light from an input port to a selected output port according to claim 13, wherein P=2.

19. An optical switch for routing a beam of light from an input port to a selected output port according to claim 13, wherein the first Z×T optical switch is a 1×2 Mach-Zehender Interferometer.

20. A method of upgrading an integrated N×N optical Mach-Zehnder interferometer, N being an even value greater than 3, to form an optical switch for routing a beam of light from an input port to a selected output port which comprises the steps of:

providing a 1×2 optical switch; and, optically coupling two input ports of the integrated N×N optical Mach-Zehnder interferometer to two output ports of the 1×2 optical switch.

* * * * *